United States Patent
Moore et al.

(10) Patent No.: US 11,512,728 B2
(45) Date of Patent: Nov. 29, 2022

(54) SYSTEM AND METHOD FOR COUPLING A HUB TO A MAIN SHAFT OF A WIND TURBINE

(71) Applicant: General Electric Company, Schenectady, NY (US)

(72) Inventors: Bradley Graham Moore, Greenville, SC (US); Rakesh Samal, Bangalore (IN); Hemant Bhimrao Pawar, Bangalore (IN); Joseph Edward Birkenstock, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 412 days.

(21) Appl. No.: 16/739,339

(22) Filed: Jan. 10, 2020

(65) Prior Publication Data
US 2021/0215184 A1    Jul. 15, 2021

(51) Int. Cl.
| | |
|---|---|
| *F16B 21/16* | (2006.01) |
| *F03D 13/10* | (2016.01) |
| *F03D 13/20* | (2016.01) |
| *F03D 80/70* | (2016.01) |
| *F03D 80/80* | (2016.01) |
| *H02K 7/18* | (2006.01) |

(52) U.S. Cl.
CPC .............. *F16B 21/16* (2013.01); *F03D 13/10* (2016.05); *F03D 13/20* (2016.05); *F03D 80/70* (2016.05); *F03D 80/88* (2016.05); *H02K 7/1838* (2013.01)

(58) Field of Classification Search
CPC .......... F03D 13/10; F03D 13/20; F03D 80/70; F03D 80/88; H02K 7/1838; F16B 21/16
See application file for complete search history.

(56) References Cited

U.S. PATENT DOCUMENTS

| | | | |
|---|---|---|---|
| 2,846,248 A | * | 8/1958 | Kliwer .................. F16B 7/0406 403/379.4 |
| 4,595,337 A | | 6/1986 | Crowe |
| 4,822,204 A | | 4/1989 | Lindenthal |
| 6,413,052 B1 | | 7/2002 | Corley |
| 7,600,964 B2 | | 10/2009 | Rogall et al. |

(Continued)

FOREIGN PATENT DOCUMENTS

| | | |
|---|---|---|
| DE | 10231948 A1 | 1/2004 |
| DE | 10351524 A1 | 8/2004 |

(Continued)

OTHER PUBLICATIONS

European Search Report for EP Application No. 20215088.4, dated Jun. 10, 2021.

*Primary Examiner* — Sean Gugger
(74) *Attorney, Agent, or Firm* — Dority & Manning, P.A.

(57) ABSTRACT

A system and method are provided for coupling a hub to a main shaft of a wind turbine. Accordingly, a plurality of fasteners are arranged within corresponding through holes of the hub of a wind turbine. At least one circumferential ridge segment is arranged radially adjacent to the head sections of the plurality of fasteners so as to resist a torque applied to each of the plurality of fasteners. A connection mechanism is utilized to secure the plurality of fasteners within the plurality of through holes so as to limit an axial translation of the plurality of fasteners prior to the coupling of the hub to the main shaft.

18 Claims, 13 Drawing Sheets

(56) References Cited

U.S. PATENT DOCUMENTS

| | | |
|---|---|---|
| 8,287,240 B2 | 10/2012 | Nitzpon |
| 8,403,786 B2 | 3/2013 | Bech |
| 8,434,964 B2 | 5/2013 | Graham et al. |
| 8,646,177 B2 | 2/2014 | Tirumalai et al. |
| 8,696,315 B2 | 4/2014 | Bonnet |
| 8,834,120 B2 | 9/2014 | De Ugarte et al. |
| 8,911,211 B2 | 12/2014 | Martinez et al. |
| 9,068,558 B2 | 6/2015 | Laursen |
| 9,145,870 B2 | 9/2015 | Redin Miqueleiz |
| 9,175,667 B2 | 11/2015 | Artal Lorente et al. |
| 9,206,743 B2 | 12/2015 | Schnetgoke |
| 9,209,665 B2 | 12/2015 | Casazza et al. |
| 9,399,921 B2 | 7/2016 | Ventura et al. |
| 9,793,777 B2 | 10/2017 | Hofmann et al. |
| 2006/0196288 A1 | 9/2006 | Aust et al. |
| 2008/0240922 A1 | 10/2008 | Eusterbarkey |
| 2011/0133474 A1* | 6/2011 | Haar ............... F03D 7/0232 290/55 |
| 2013/0011253 A1* | 1/2013 | Mulcaire ............ F01D 25/265 415/214.1 |

FOREIGN PATENT DOCUMENTS

| | | |
|---|---|---|
| EP | 2441954 B1 | 8/2016 |
| EP | 2758661 B1 | 10/2016 |
| GB | 2467226 A | 7/2010 |
| WO | WO2008092448 A1 | 8/2008 |

* cited by examiner

SYSTEM AND METHOD FOR COUPLING A HUB TO A MAIN SHAFT OF A WIND TURBINE

FIELD

The present disclosure relates in general to wind turbines, and more particularly to a mounting system and method for coupling a hub to a main shaft of the wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades secured thereto. The rotor may also be mechanically coupled to a main shaft that drives the gearbox. The gearbox then drives the generator. The main shaft, the gearbox, and the generator are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to the gearbox, or if a gearbox is not used, directly to the generator. The generator then converts the mechanical energy to electrical energy the electrical energy may be transmitted to a converter and/or a transformer housed within the tower and subsequently deployed to a utility grid.

For conventional wind turbines, in order to fasten the hub to the main shaft, threaded fasteners are generally secured in threaded fastener holes formed in the body of the hub and corresponding holes formed in the main shaft. However, the hub body is often a cast component which is formed from a relatively soft casting material, compared to the material of the threaded fasteners. As such, it is common to lose a significant amount of preload of the threaded fasteners due to the relaxation of the hub threads. Thus, some wind turbines have employed through fasteners to avoid the loss of preload due to the relaxation of the hub threads.

While employing through fasteners may eliminate the loss of preload due to the relaxation of the hub threads, the utilization of through fasteners may create additional challenges. Specifically, the hub is typically mounted to the main shaft after the nacelle has been mounted atop the tower. As such, the joining of the hub to the nacelle is accomplished at a significant height (e.g., about 150 meters) above the ground. Because the hub is typically suspended a significant height above the ground during installation, safety limitations preclude personnel from entering the hub prior to its coupling to the main shaft. As such, personnel are not available to insert and align the fasteners prior to the hub's coupling to the main shaft. Additionally, not being permitted to enter the suspended hub may also preclude the ability of personnel to provide a counter torque to the fasteners during the coupling operation.

Thus, the art is continuously seeking new and improved systems and methods that address the aforementioned issues. Accordingly, the present disclosure is directed to an improved mounting system and method for coupling the hub to the main shaft of the wind turbine.

BRIEF DESCRIPTION

Aspects and advantages of the invention will be set forth in part in the following description, or may be obvious from the description, or may be learned through practice of the invention.

In one aspect, the present disclosure is directed to a method for coupling a hub to a main shaft of a wind turbine. The method may include inserting a plurality of fasteners into a corresponding plurality of through holes formed in the hub. The plurality of through holes may be arranged in a circular array about a rotational axis of the hub. Each of the plurality of fasteners may include a head section and a shank section. The method may also include positioning at least one circumferential ridge segment radially adjacent to the head sections of the plurality of fasteners. The method may include aligning a longitudinal axis of each of the plurality of fasteners with a longitudinal axis of the corresponding through holes. The method may include limiting an axial translation of the plurality of fasteners in the plurality of through holes via a connection mechanism between the plurality of fasteners and the hub. The method may also include positioning the hub adjacent to the main shaft of the wind turbine. Additionally, the method may include inserting each of the plurality of fasteners within the through holes and a corresponding plurality of receiving holes of the main shaft of the wind turbine. Further, the method may include resisting, via contact between the head sections and the circumferential ridge segment(s), a torque applied to the shaft section so as to secure each of the plurality of fasteners within the through holes and the corresponding plurality of receiving holes of the main shaft.

In an embodiment, positioning the ridge segment(s) may also include machining a U-channel on the hub. The U-channel may include at least one radially inner circumferential ridge segment disposed adjacent to a radially inner face of the head section of the plurality of fasteners. The U-channel may also include at least one radially outer circumferential ridge segment disposed adjacent to a radially outer face of the head sections of the plurality of fasteners. The radially inner and radially outer circumferential ridge segments may define an axial plane which is coplanar with an axial face of the head sections of the plurality of fasteners.

In an embodiment, limiting the axial translation of the plurality of fasteners via a connection mechanism may also include coupling at least one retaining ring segment to the hub. The retaining ring segment(s) may be positioned adjacent to an axial face of the head sections of the plurality of fasteners opposite the shank section.

In an embodiment, the retaining ring segment(s) and the circumferential ridge segment(s) may be a unitary component. Positioning the circumferential ridge segment(s) may also include coupling the unitary component to the hub radially adjacent to the head sections and adjacent to the axial face of the head sections.

In an additional embodiment, the retaining ring segment(s) is a spring member or further comprises an elastomeric member disposed in contact with the axial face of the head sections of the plurality of fasteners. Limiting an axial translation may also include absorbing a shock during a mounting procedure, while retaining the alignment of the longitudinal axis of each of the plurality of fasteners with a longitudinal axis of the corresponding through holes.

In another aspect, the present disclosure is directed to a mounting system for coupling a hub to a main shaft of a wind turbine. The mounting system may include a plurality of fasteners arranged within corresponding through holes arranged in a circular array about a rotational axis of the hub. Each of the plurality of fasteners may include a head section and a shank section. The head section may have a cross-sectional area greater than a cross-sectional area of the shank section. The head section may distribute a torque load to the hub when coupled to the main shaft. The mounting system may also include the circumferential ridge segment(s) arranged radially adjacent to the head sections of the plurality of fasteners so as to resist a torque applied to each of the plurality of fasteners. Additionally, the mounting system may include a connection mechanism securing the plurality of fasteners within the plurality of through holes so as to limit an axial translation of the plurality of fasteners prior to the coupling of the hub to the main shaft.

In another aspect, the present disclosure is directed to a mounting system for coupling a hub to a main shaft of the wind turbine. The mounting system may include a plurality of fasteners arranged within corresponding through holes arranged in a circular array about a rotational axis of the hub. Each of the plurality of fasteners may include a head section and a shank section. The head section may have a cross-sectional area greater than a cross-sectional area of the shank section. The shank section may have a first end and a second end disposed opposite thereof. The first end may define a first threaded portion configured to be received by the main shaft of the turbine. The mounting system may also include a connection mechanism securing the plurality of fasteners within the plurality of through holes so as to limit an axial translation of the plurality fasteners prior to the coupling of the hub to the main shaft. The connection mechanism may include a threaded portion of each of the through holes. The threaded portions may have a longitudinal length less than a longitudinal length of the through hole. The connection mechanism may also include a second threaded portion defined by the second end of the plurality of fasteners. The second threaded portion may be configured to engage the corresponding threaded portion of the through holes. The second threaded portion may be configured to resist a torque transmitted to the first threaded portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
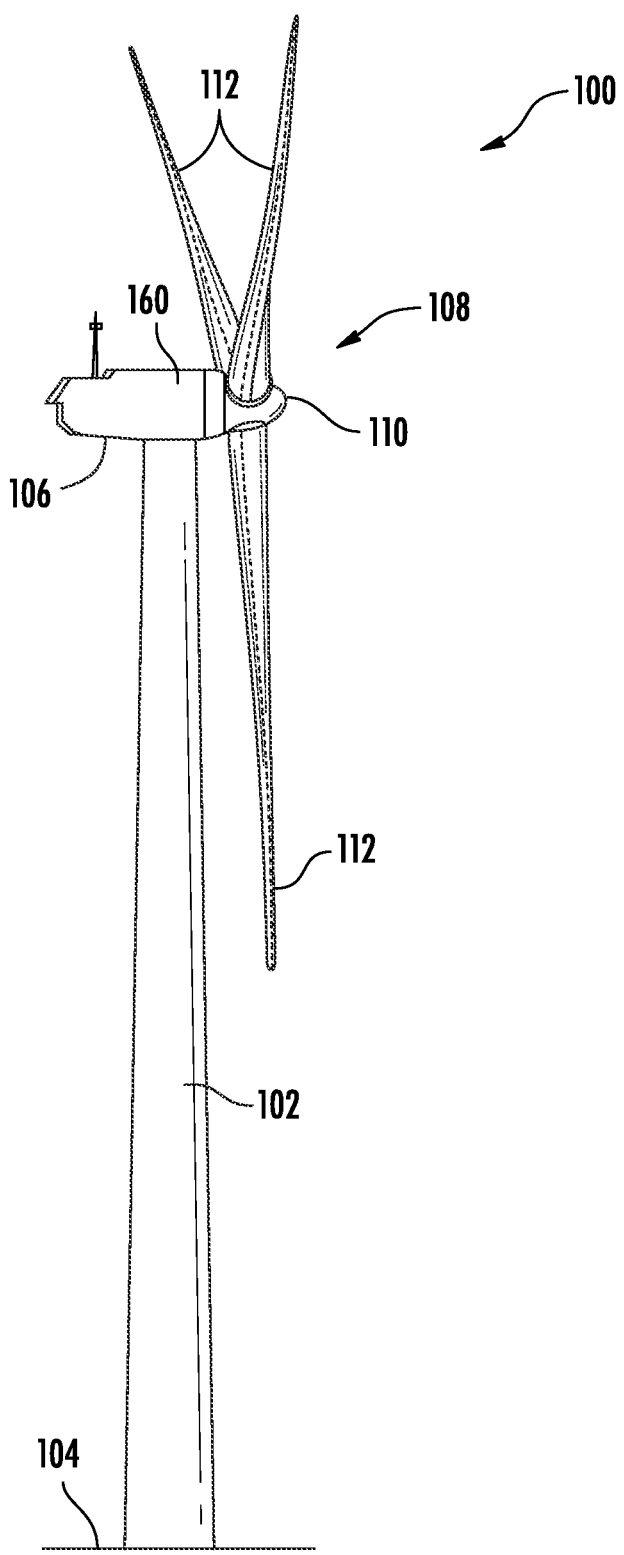
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to a system and method for coupling a hub to a main shaft of a wind turbine. In particular, the present disclosure may include an array of through holes arranged in the hub. A corresponding number of fasteners may be inserted through each of the through holes. Inserting the fasteners into the through holes may bring the head of the fasteners into contact with at least one circumferential ridge segment. The circumferential ridge segment(s) may be positioned radially adjacent to the head section and configured to resist a torque applied to each of the fasteners. In other words, the circumferential ridge segment(s) may prevent the fastener from rotating as the hub is secured to the main shaft of the wind turbine by a nut or other fastener. It should be appreciated that because the head of the fastener is prevented from rotating by the circumferential ridge segment, it may be unnecessary for personnel to enter the hub section to hold the head in position prior to the hub section being coupled to the main shaft.

In addition to being prevented from rotating without the intervention of personnel, the fasteners may also be retained in the through holes prior to coupling to the main shaft. Specifically, a connection mechanism may prevent an axial movement of the fasteners prior to the fasteners being secured to the main shaft. In other words, the connection mechanism may, without the intervention of personnel, prevent the fasteners from being dislodged or otherwise falling out of the through holes during the hoisting and mounting of the hub. For example, in at least one embodiment, the fasteners may be secured in the through holes by coupling at least one retaining ring segment to the hub. The retaining ring segment(s) may be generally perpendicular to the circumferential ridge segment(s) and may affect an axial face of the fasteners. In additional embodiments, the connection mechanism might include a bushing, an epoxy, a brazing, and/or a threaded portion of the fastener. It should be appreciated that retaining the fasteners in the through holes during hoisting and mounting operations, while maintaining an alignment of the fasteners, may preclude a requirement for personnel to enter the suspended hub to insert the fasteners prior to securing the fasteners to the main shaft.

Referring now to the drawings, FIG. 1 illustrates a perspective view of one embodiment of a wind turbine 100 according to the present disclosure. As shown, the wind turbine 100 generally includes a tower 102 extending from a foundation 104, a nacelle 106, which includes an outer shell 160, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

Figure 2:
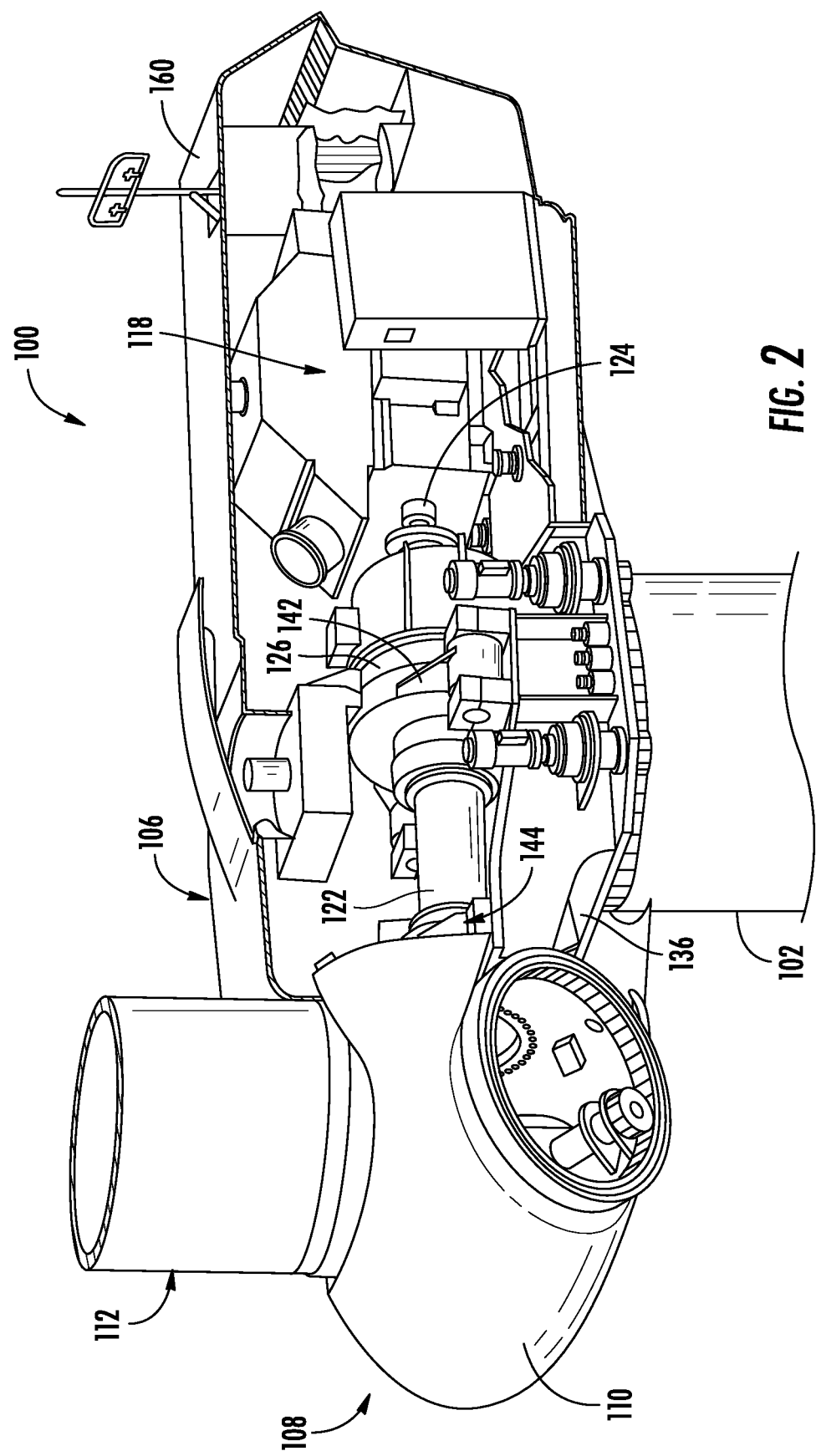
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a main shaft 122 coupled to the hub 110 for rotation therewith. The main shaft 122 may be rotatably supported by a main bearing 144. The main shaft 122 may, in turn, be rotatably coupled to a generator shaft 124 of the generator 118 through a gearbox 126 connected to a bedplate support frame 136 by one or more torque arms 142. As is generally understood, the main shaft 122 may provide a low speed, high torque input to the gearbox 126 in response to rotation of the rotor blades 112 and the hub 110. The gearbox 126 may then be configured to convert the low speed, high torque input to a high speed, low torque output to drive the generator shaft 124 and, thus, the generator 118.

Figure 3:
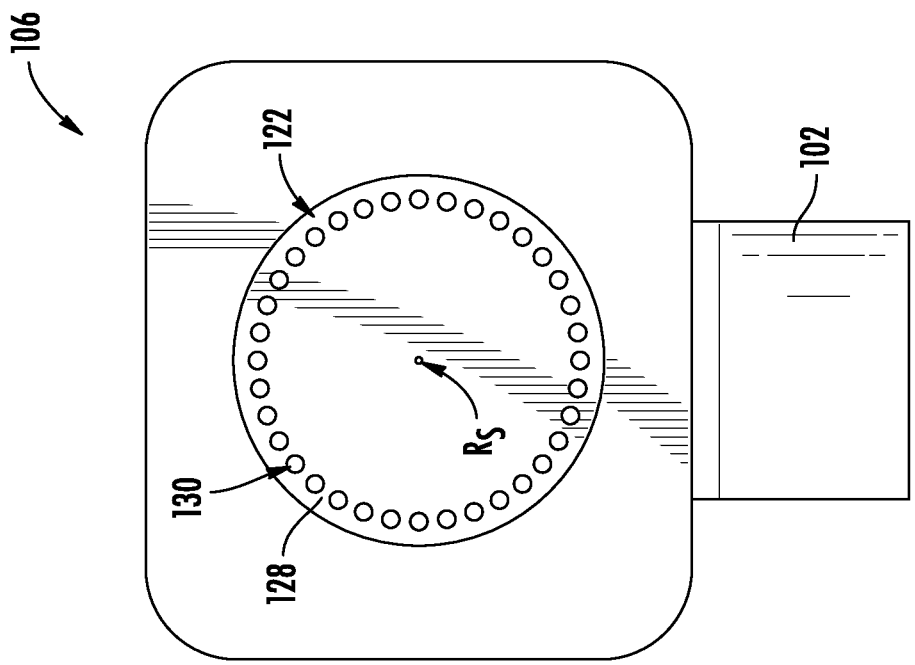
FIG. 3 illustrates a front view of one embodiment of a nacelle of a wind turbine without a hub according to the present disclosure.

Referring now to FIG. 3, a front view of one embodiment of the nacelle 106 of the wind turbine 100 is illustrated without the hub 110 according to the present disclosure. As shown, the main shaft 122 may be formed with a receiving face 128. The main shaft 122 may also include a plurality of receiving holes 130 which are defined by the receiving face 128. In at least one embodiment, the plurality of receiving holes 130 may be arranged in a circular array about an axis of rotation ($R_S$) of the main shaft 122. The receiving face 128 and the plurality of receiving holes 130 may be configured to receive the hub 110 and provide for secure mounting thereof.

Figure 4:
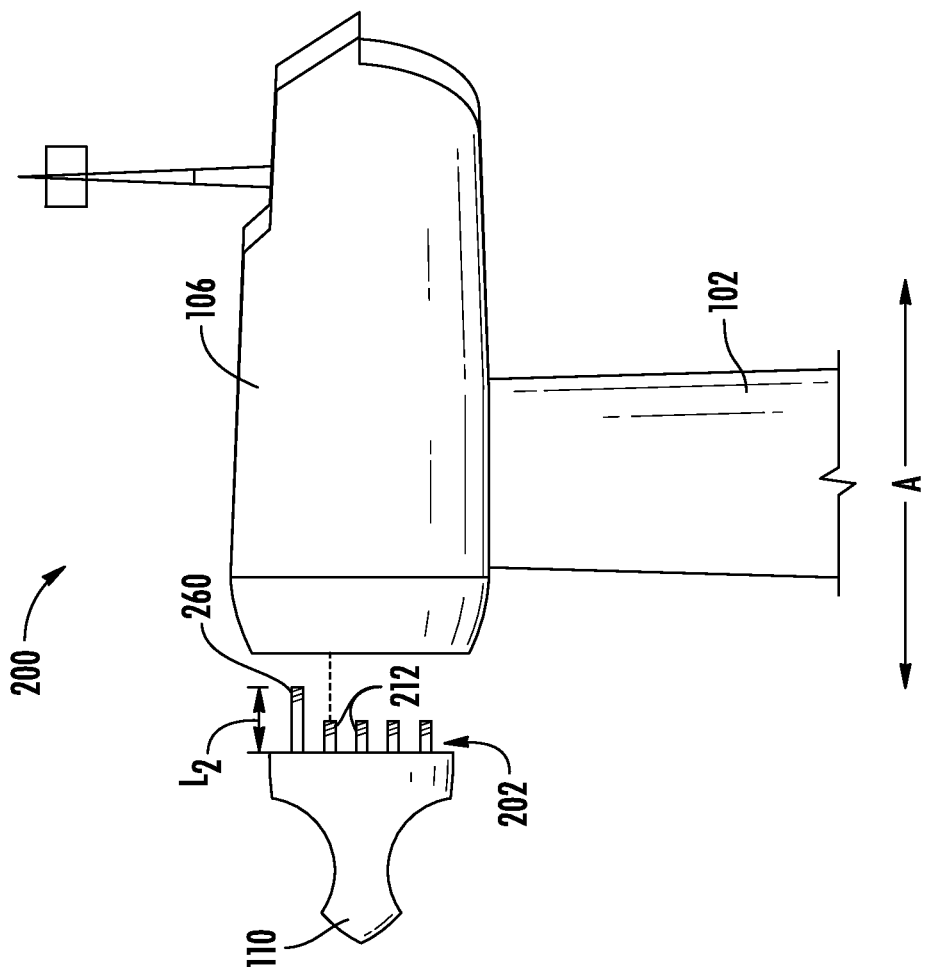
FIG. 4 illustrates a side view of one embodiment of a nacelle and a hub of a wind turbine particularly illustrating a mounting system for coupling the hub to the main shaft of the wind turbine according to the present disclosure.
Figure 5:
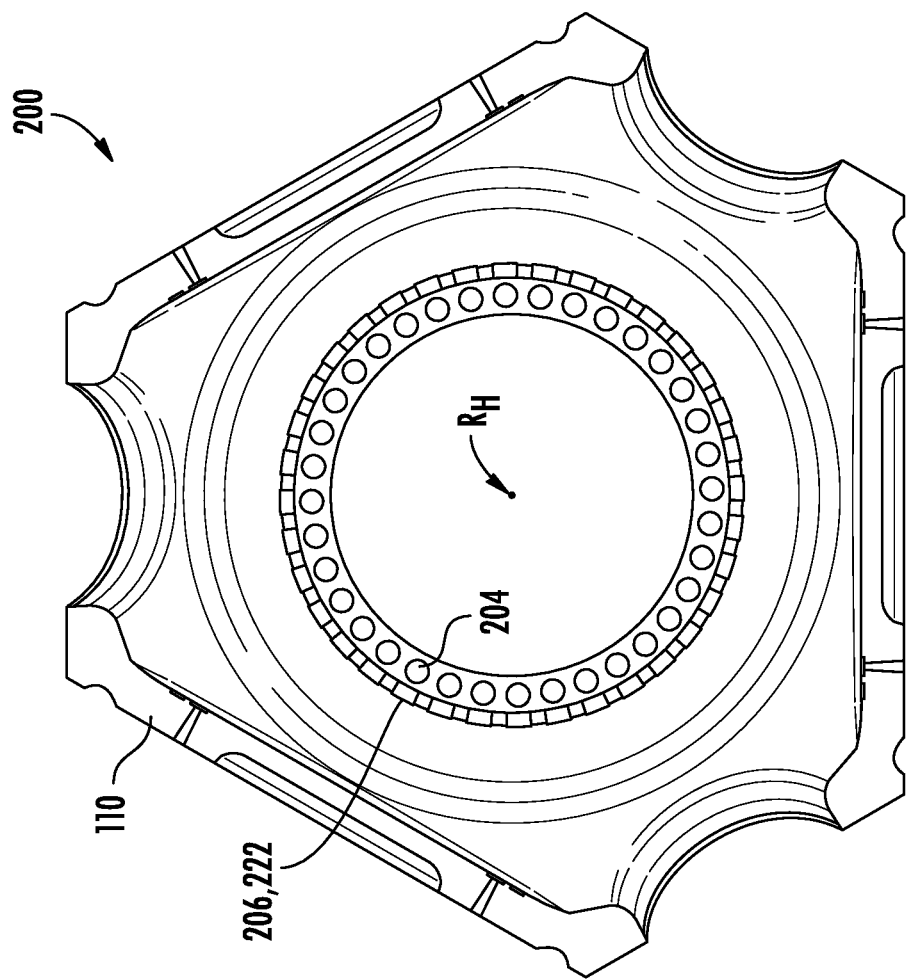
FIG. 5 illustrates a front section view of one embodiment of a hub of wind turbine according to the present disclosure.

Referring now to FIGS. 4-17, a mounting system 200 for coupling the hub 110 to the main shaft 122 of the wind turbine 100 is presented according to the present disclosure. In an embodiment, as shown in FIG. 4, the mounting system 200 may include a plurality of fasteners 202. The fasteners 202 may be arranged within corresponding through holes 204 of the hub 110 (FIG. 5). As shown in FIG. 5, the through holes 204 may be arranged in a circular array about a rotational axis ($R_H$) of the hub 110. The mounting system 200 may also include at least one circumferential ridge segment 206. The circumferential ridge segment(s) 206 may be arranged radially adjacent to the plurality of fasteners 202. The circumferential ridge segment(s) 206 may resist a torque applied to each of the plurality of fasteners 202. The mounting system 200 may also include a connection mechanism 208. The connection mechanism 208 may secure the plurality of fasteners 202 within the plurality of through holes 204. In an embodiment, the connection mechanism 208 may limit an axial translation of the plurality of fasteners 202 prior to the coupling of the hub 110 to the main shaft 122. It should be appreciated that an axial translation includes any movement of the fasteners 202 generally along the axis (A) relative to the through holes 204.

Figure 6:
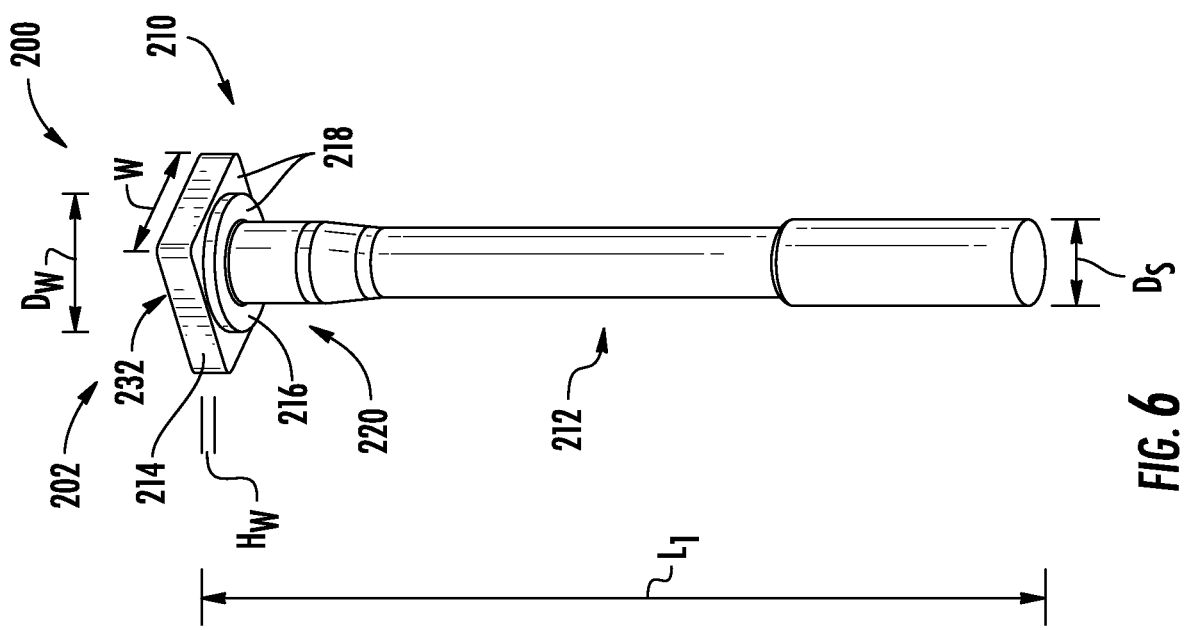
FIG. 6 illustrates a perspective view of one embodiment of a fastener for coupling a hub to the main shaft of a wind turbine according to the present disclosure.

As particularly depicted in FIG. 6, the fasteners 202 of the mounting system 200 may include a head section 210 and a shank section 212. For example, the fasteners 202 may be bolts which, along with a corresponding plurality of nuts, can be configured to secure the hub 110 to the main shaft 122. In an embodiment, the head section 210 may distribute a torque load to the hub 110 when coupled to the main shaft 122. At least a portion of the shank section 212 may be threaded. In at least one embodiment, the head section 210 may have a cross-sectional area greater than a cross-sectional area of the shank section 212.

As depicted in FIGS. 6-17, the fasteners 202 of the mounting system 200 may, in at least one embodiment, be formed so that the head section 210 includes a square head 214. In an additional embodiment, the head section 210 may include an integral washer 216 disposed between the square head 214 and the shank section 212. In an embodiment, the head section 210 may include at least one contact face 218. The contact face(s) 218 may be configured to increase the friction between the fasteners 202 and the hub 110. For example, the contact face(s) 218 may be formed with a plurality of ridges, protrusions, and/or teeth configured to interface with the hub 110 and increase the friction therebetween.

In order to distribute a load to the hub 110 during coupling, the square head 214 may, in an embodiment, have a width (W) which is greater than or equal to 175% and less than or equal to 225% of a shank section diameter ($D_S$). For example, in at least one embodiment, the width (W) may be greater than 190% of the shank section diameter ($D_S$). Similarly, the width (W) may be less than 200% of the shank section diameter ($D_S$). In an embodiment wherein the fastener 202 includes the integral washer 216, the integral washer 216 may have a diameter ($D_W$) which is greater than or equal to 150% and less than or equal to 200% of the shank section diameter ($D_S$). For example, in at least one embodiment, the integral washer 216 may have a diameter ($D_W$) which is greater than 170% of the shank section diameter ($D_S$). The integral washer may also have a diameter ($D_W$) which is less than 175% of the shank section diameter ($D_S$). In at least one embodiment, the integral washer may have a height ($H_W$) which is greater than or equal to 10% and less than or equal to 20% of the shank section diameter ($D_S$). For example, in at least one embodiment, the height ($H_W$) may be less than 15% of the shank section diameter ($D_S$).

Figure 9:
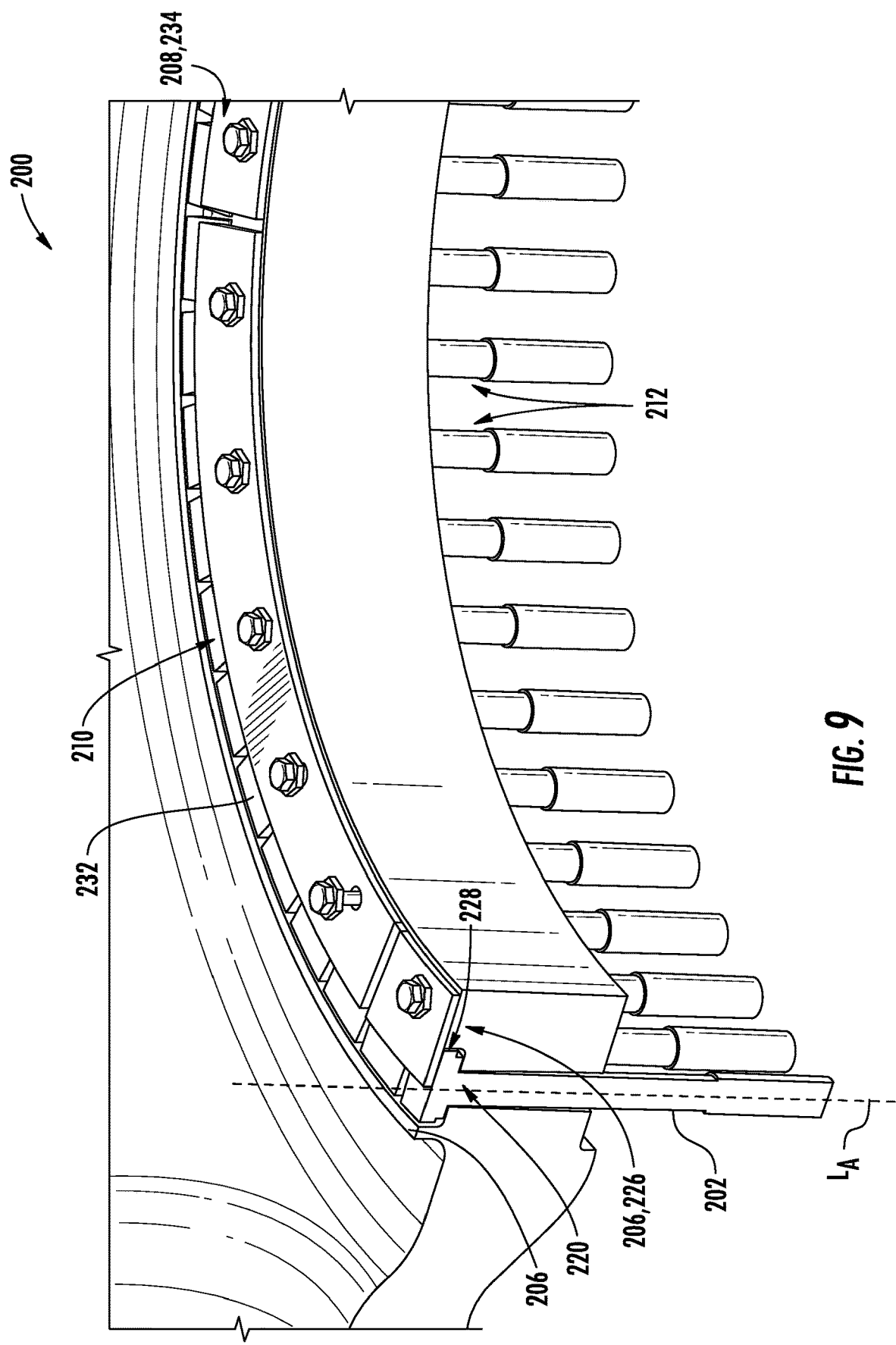
FIG. 9 illustrates a perspective section view of one embodiment of a mounting system for coupling a hub to a main shaft of the wind turbine according to the present disclosure.
Figure 16:
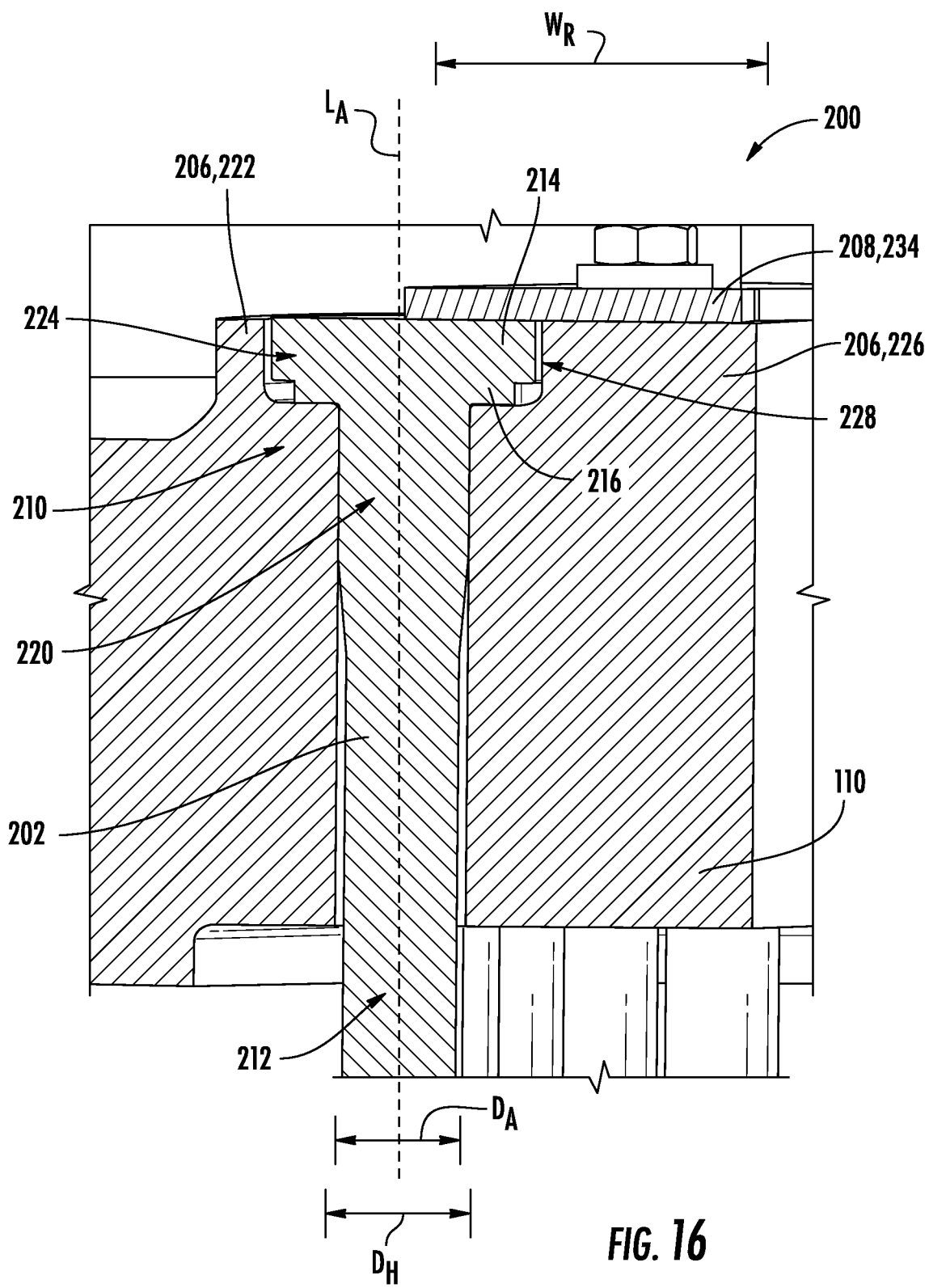
FIG. 16 illustrates a side section view of one embodiment of a mounting system for coupling a hub to a main shaft of the wind turbine according to the present disclosure.

In an embodiment, such as depicted in FIGS. 6, 9, and 16, the fasteners 202 may include an alignment portion 220 disposed adjacent to the head section 210. The alignment portion 220 may have a length which is less than the length of the shank section 212. The alignment portion 220 may establish and retain an alignment of a longitudinal axis ($L_A$) of the fasteners 202 with the longitudinal axis ($L_A$) of the corresponding through holes. In at least one embodiment, the alignment portion 220 may be formed with a diameter ($D_A$) which is greater than the shank section diameter ($D_S$). In an embodiment, the alignment portion 220 may have a diameter ($D_A$) which is greater than 98% and less than 100% (e.g., is greater than 99.25% and less than 99.75%) of a diameter of the through hole ($D_H$). It should be appreciated that machining the alignment portion 220 with the specified precision may facilitate the retention of the alignment of the fastener 202 without requiring the same high degree of precision over the length of the fastener 202. It should be further appreciated that manufacturing the entire fastener 202 to the same tolerances as those required for the alignment portion 220 may unnecessarily increase the cost of the mounting system 200.

As depicted in FIGS. 5, 7-13, and 16, in an embodiment, the mounting system 200 may include the circumferential ridge segment(s) 206. The circumferential ridge segment(s) 206 may be arranged radially adjacent to the head sections 210 of the fasteners 202 to resist a torque applied to the fasteners 202 during the coupling of the hub 110 to the main shaft 122. In other words, the circumferential ridge segment(s) 206 may prevent the fasteners 202 from rotating in response to a nut or other similar fastener being threaded and torqued onto the shank section 212.

Figure 8:
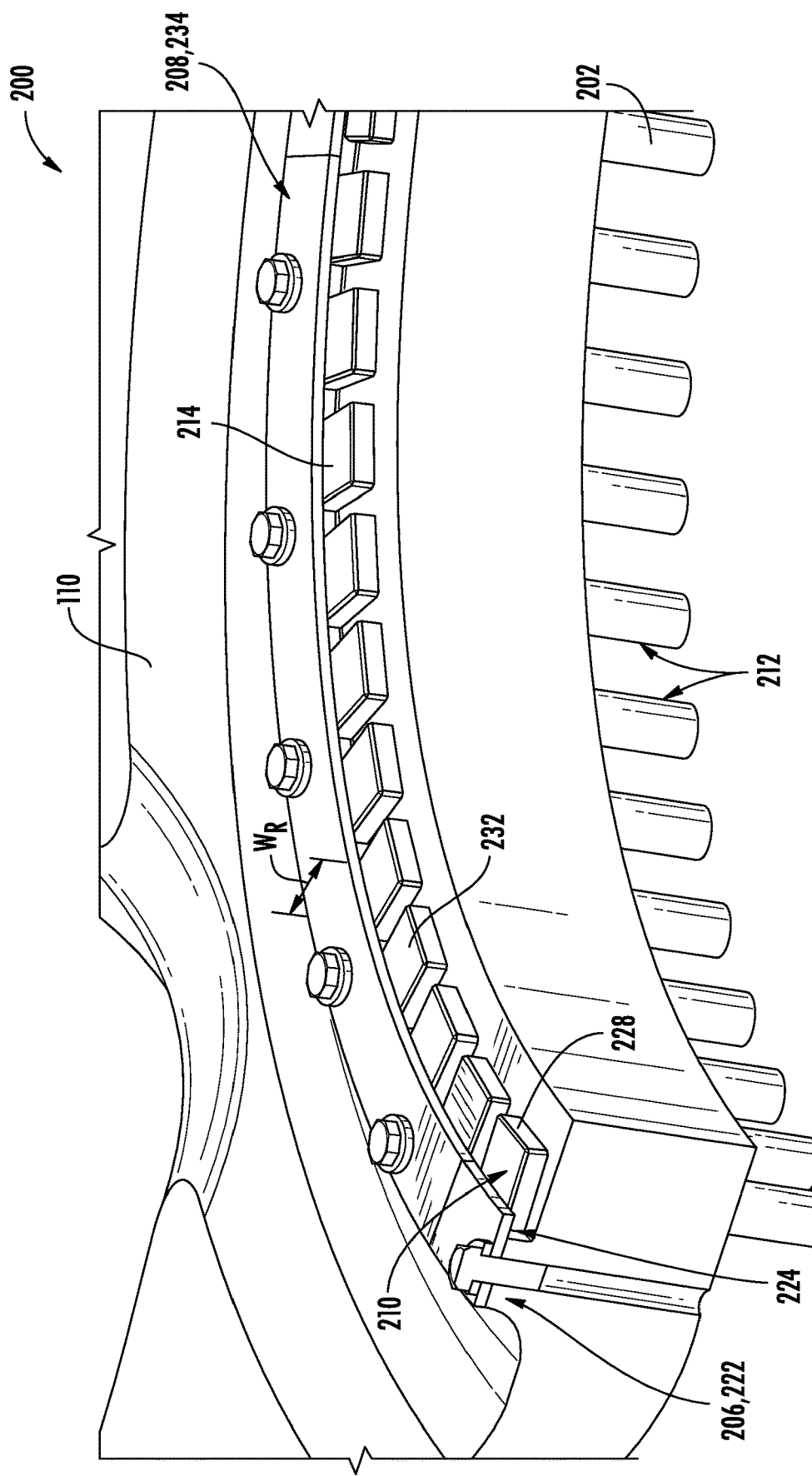
FIG. 8 illustrates a perspective section view of one embodiment of a mounting system for coupling a hub to a main shaft of the wind turbine according to the present disclosure.

In at least one embodiment, such as depicted in FIG. 5, the circumferential ridge segment(s) 206 may include a plurality of circumferential ridge segments 206 arranged in radial alignment with the through holes 204. In an additional embodiment, the circumferential ridge segment(s) 206 may form a continuous ridge encircling the rotational axis ($R_H$) of the hub 110. The circumferential ridge segment(s) 206 may, as depicted in FIGS. 5 and 8, form at least one radially outer circumferential ridge segment 222. The radially outer circumferential ridge segment(s) 222 may be disposed adjacent to a radially outer face 224 of the head sections 210. In an additional embodiment, the circumferential ridge segment(s) 206 may form at least one radially inner circumferential ridge segment 226. The radially inner circumferential ridge segment(s) 226 may be disposed adjacent to a radially inner face 228 of the head sections 210. It should be appreciated that the terms "radially inner" and "radially outer" refer to a distance from the rotational axis ($R_H$) of the hub 110. As such, the radially inner circumferential ridge segment(s) 226 may be positioned between the rotational axis ($R_H$) of the hub 110 and the plurality of through holes 204. Similarly, the plurality of through holes 204 may be positioned between the rotational axis ($R_H$) of the hub 110 and the radially outer circumferential ridge segment(s) 222.

Figure 10:
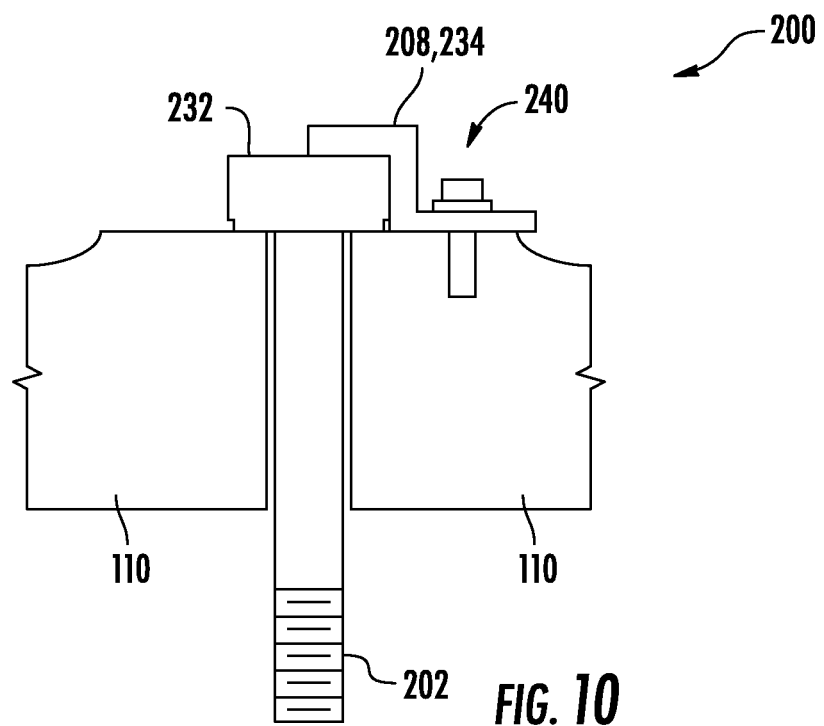
FIG. 10 illustrates a side section view of one embodiment of a mounting system for coupling a hub to a main shaft of the wind turbine according to the present disclosure.
Figure 12:
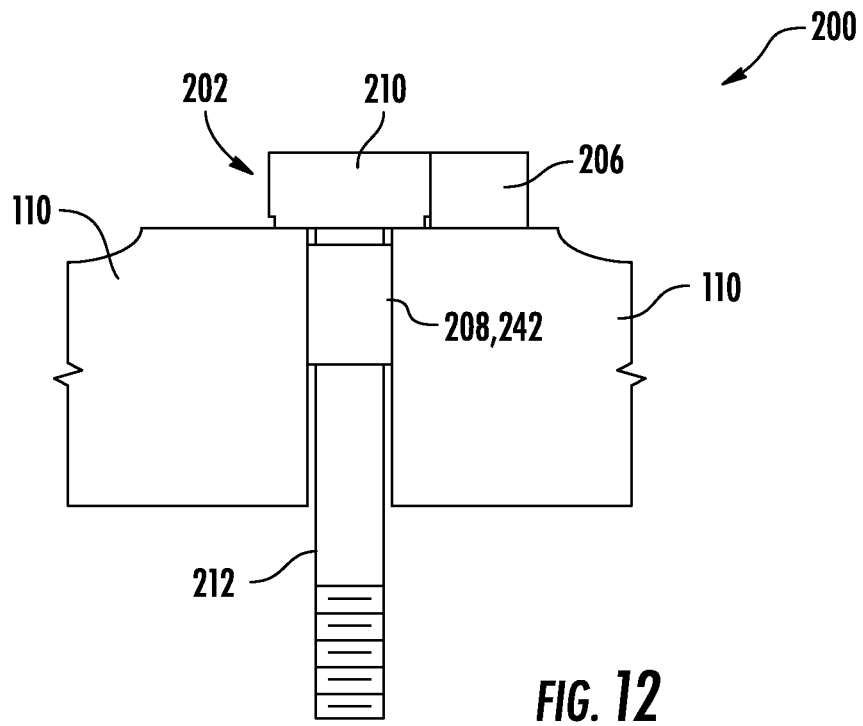
FIG. 12 illustrates a side section view of one embodiment of a mounting system for coupling a hub to a main shaft of the wind turbine according to the present disclosure.
Figure 13:
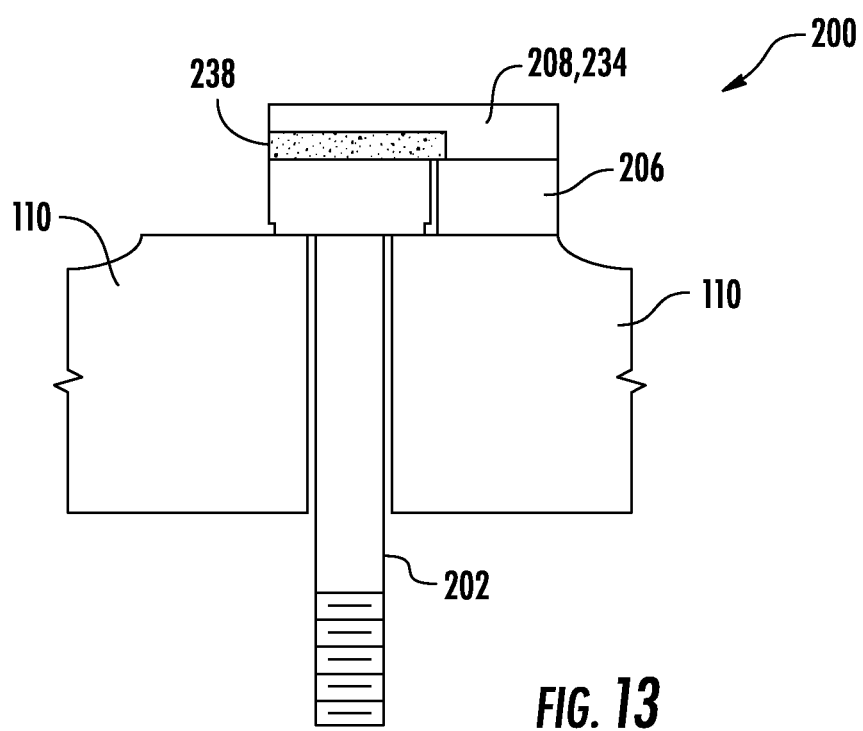
FIG. 13 illustrates a side section view of one embodiment of a mounting system for coupling a hub to a main shaft of the wind turbine according to the present disclosure.

The circumferential ridge segments 206 may, in an embodiment, be integrally formed with the hub 110. For example, the circumferential ridge segments 206 may be formed during the manufacturing (e.g., casting and/or additive manufacturing) of the hub 110. In an embodiment, the circumferential ridge segments 206 may protrude from a surface of the hub 110. In an alternative embodiment, the circumferential ridge segments 206 may be formed by machining a recess 230 on a surface of the hub 110. In additional embodiments, such as depicted by FIGS. 10, 12, and 13, the circumferential ridge segment(s) 206 may be a separate component which is coupled to the hub 110. It should be appreciated that the circumferential ridge segment(s) 206 may have a height and/or a depth relative to the hub 110 sufficient to secure the fasteners 202 in a specified orientation.

In embodiments such as depicted in FIGS. 7, 9, 11, and 16, the mounting system 200 may include the circumferential ridge segment(s) 206 as a U-channel. The U-channel may include the radially inner circumferential ridge segment(s) 226 disposed adjacent to the radially inner face 228 of the head sections 210 of the fasteners 202. The U-channel may also include the radially outer circumferential ridge segment(s) 222 disposed adjacent to the radially outer face 224 of the head sections 210 of the fasteners 202. In embodiments, such as particularly depicted in FIGS. 11 and 16, the radially inner and radially outer circumferential ridge segments 222, 226 may define an axial plane ($A_P$) which is coplanar with an axial face 232 of the head sections 210 of the plurality of fasteners 202.

Referring now to FIGS. 7-17, the mounting system 200 may also include a connection mechanism 208 configured to retain the fasteners 202 in the through holes 204 as the hub 110 is hoisted to the nacelle 106 and coupled to the main shaft 122. In at least one embodiment, the connection mechanism 208 may also at least temporarily secure the fasteners 202 in the respective through holes so as to maintain the alignment of the longitudinal axis ($L_A$) of the fasteners 202 with the longitudinal axis ($L_A$) of the corresponding through holes. In an additional embodiment, the connection mechanism 208 may also provide a shock absorbing capability to the mounting system 200. The shock absorbing capability may permit a degree of axial movement in the event a fastener 202 inadvertently impacts the main shaft 122, or another component of the wind turbine 100, during a mounting operation. By permitting a degree of axial movement of the fasteners 202, the shock absorbing capability of the mounting system 200 may reduce a likelihood of damaging at least one of the fasteners 202 due to incidental contact. It should be appreciated that over the lifecycle of the wind turbine 100, it may be necessary to remove one or more of the fasteners 202. As such, the connection mechanism 208 may be configured to permit the removal of the fasteners 202 following the coupling of the hub 110 to the main shaft 122. For example, in at least one embodiment, the connection mechanism 208 may be removed following the installation of the hub 110 on the wind turbine 100.

Referring to FIGS. 7-11, 13, and 16, in at least one embodiment, the connection mechanism 208 may include at least one retaining ring segment 234 coupled to the hub 110. The retaining ring segment(s) 234 may be positioned adjacent to the axial face 232 of the head sections 210 of the fasteners 202 opposite the shank sections 212. In an embodiment, the retaining ring segment(s) 234 may be arranged so as to form a circumferential ring about the rotational axis ($R_H$) of the hub 110. The circumferential ring may be formed from a plurality of retaining ring segments 234. However, in an alternative embodiment, the retaining ring segment 234 may be a unitary structure forming a single, uninterrupted ring. The retaining ring segment(s) 234 may be formed from sheet-metal, wood, a plastic, a composite, and/or other material suitable for resisting an axial movement of the fasteners 202. The retaining ring segment(s) 234 may be coupled to the hub 110 via a plurality of retaining ring fasteners 236. In an additional embodiment, the retaining ring segment(s) 234 may be coupled to the hub 110 via an adhesive, a braze, a magnetic coupling, and/or a mechanical coupling, such as a twist-lock.

Figure 7:
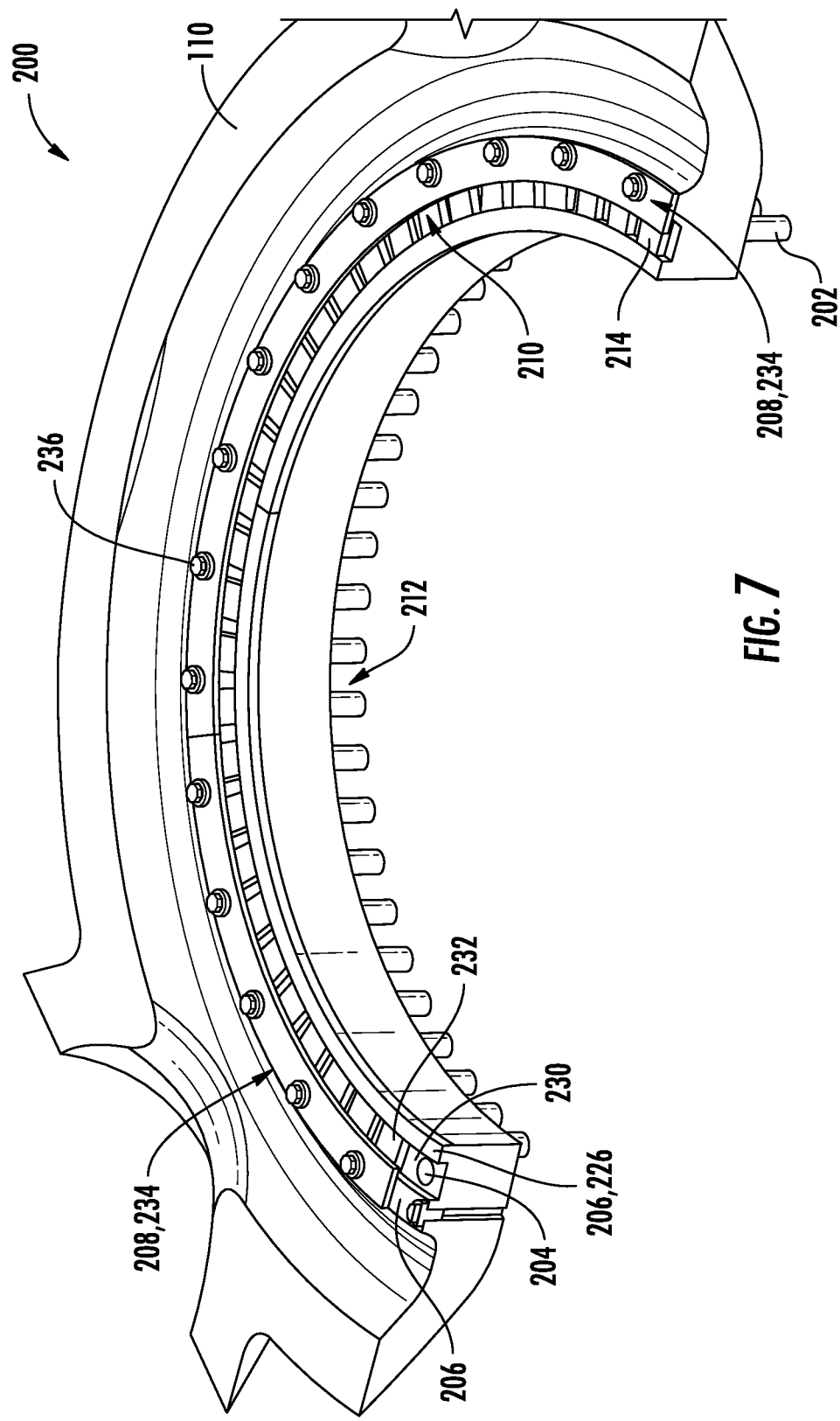
FIG. 7 illustrates a perspective section view of one embodiment of a mounting system for coupling a hub to a main shaft of the wind turbine according to the present disclosure.

As depicted in FIGS. 7-9, 11, and 16, the retaining ring segment(s) 234 of the connection mechanism 208 may, in an embodiment, be coupled to the circumferential ridge segment(s) 206. In at least one embodiment, such as depicted in FIGS. 7 and 8, the retaining ring segment(s) 234 may be coupled to the radially outer circumferential ridge segment(s) 222. In an alternative embodiment, such as depicted in FIGS. 9 and 16, the retaining ring segment 234 may be coupled to the radially inner circumferential ridge segment(s) 226. The retaining ring segment(s) 234 may extend from the respective circumferential ridge segment(s) 206 so as to define a radial width ($W_R$) which at least partially occludes the axial face 232 of the head sections 210.

Figure 11:
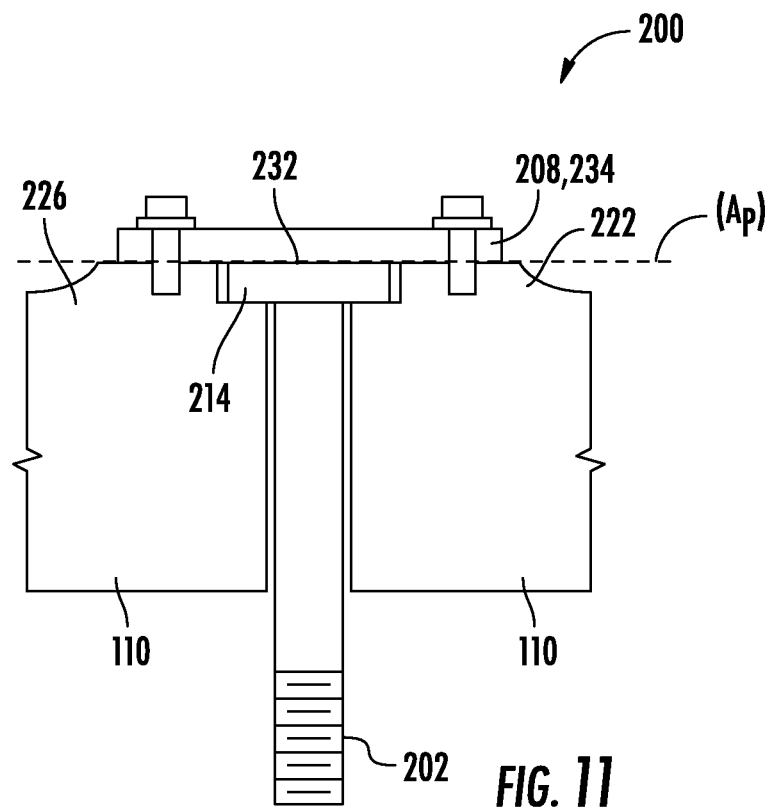
FIG. 11 illustrates a side section view of one embodiment of a mounting system for coupling a hub to a main shaft of the wind turbine according to one embodiment of the present disclosure.

As particularly depicted in FIG. 11, in an embodiment, the retaining ring segment(s) 234 may be coupled to both the radially inner and radially outer circumferential ring segments 222, 226. As such, in an embodiment, the retaining ring segment(s) 234 may span the U-channel. It should be appreciated that spanning the U-channel does not necessitate the complete occlusion of the axial face 232 of the head sections 210. For example, in an embodiment wherein a plurality of retaining ring segments 234 may be employed, each of the retaining ring segments 234 may have a circumferential width which is less than the width (W) of the square head 214. It should be further appreciated that coupling the retaining ring segment(s) 234 to both the radially inner and radially outer circumferential ring segments 222, 226 may increase a rigidity of the retaining ring segment(s) 234 without necessitating a corresponding increase in an axial thickness of the retaining ring segment(s) 234. This may, in turn, permit the utilization of a retaining ring segment(s) 234 that is axially thinner than a retaining ring segment(s) 234 coupled to a single circumferential ridge segment(s) 206.

In an embodiment, such as depicted in FIG. 13, the retaining ring segment(s) 234 may also include an elastomeric member 238. The elastomeric member 238 may be disposed in contact with the axial face 232 of the head sections 210 of the fasteners 202. The elastomeric member 238 may, in at least one embodiment, be configured to absorb a shock during a mounting procedure. For example, in the event a fastener 202 contacts the main shaft 122 prior to insertion into the corresponding receiving holes 130, the elastomeric member 238 may permit a degree of axial movement of the fastener 202 thereby reducing a risk of damage to the fastener 202. The elastomeric member 238 may also be configured to retain an alignment of the longitudinal axis ($L_A$) of each of the fasteners 202 with the longitudinal axis ($L_A$) of the corresponding through holes 204. In an additional embodiment, the shock absorbing and alignment retention functions of the elastomeric member 238 may be performed or augmented by forming the retaining ring segment(s) 234 as a spring member. In at least one embodiment, the spring member may be disposed in contact with the axial face 232 of the head sections 210 in lieu of the elastomeric member 238. It should be appreciated that maintaining the alignment between the respective longitudinal axes ($L_A$) may facilitate the receiving of the fasteners 202 by the corresponding receiving holes 130.

In an embodiment, such as depicted in FIG. 10, the retaining ring segment(s) 234 and the circumferential ridge segment(s) 206 may be formed as a unitary component 240. The unitary component 240 may be coupled to the hub 110. The unitary component 240 may perform any of the functions and have any of the attributes discussed herein with regards to the circumferential ridge segment(s) 206 and the retaining ring segment(s) 234. For example, the unitary component 240 may both resist a torque applied to each of the plurality of fasteners 202 and also limit an axial translation of the fasteners 202. The unitary component may be formed from sheet-metal, wood, a plastic, a composite, and/or other material suitable for facilitating the coupling of the hub 110 to the main shaft 122 of the wind turbine 100.

As is particularly illustrated in FIG. 12, the connection mechanism 208 of the mounting system 200 may, in an embodiment, include a bushing 242 encircling a portion of the shank section 212 of the fasteners 202. The bushing 242 may be configured to at least temporarily secure the fasteners 202 within the through holes 204. In an embodiment, the bushing 242 may be configured to absorb a shock during a mounting procedure coupling the hub 110 to the main shaft 122. The bushing 242 may, in an embodiment, be configured to retain an alignment of the respective longitudinal axes ($L_A$) as previously discussed. The bushing 242 may be formed from an elastomeric material. In an additional embodiment, the bushing 242 may be sized so as to establish a press-fit between the fasteners 202 and the corresponding through holes 204.

Figure 14:
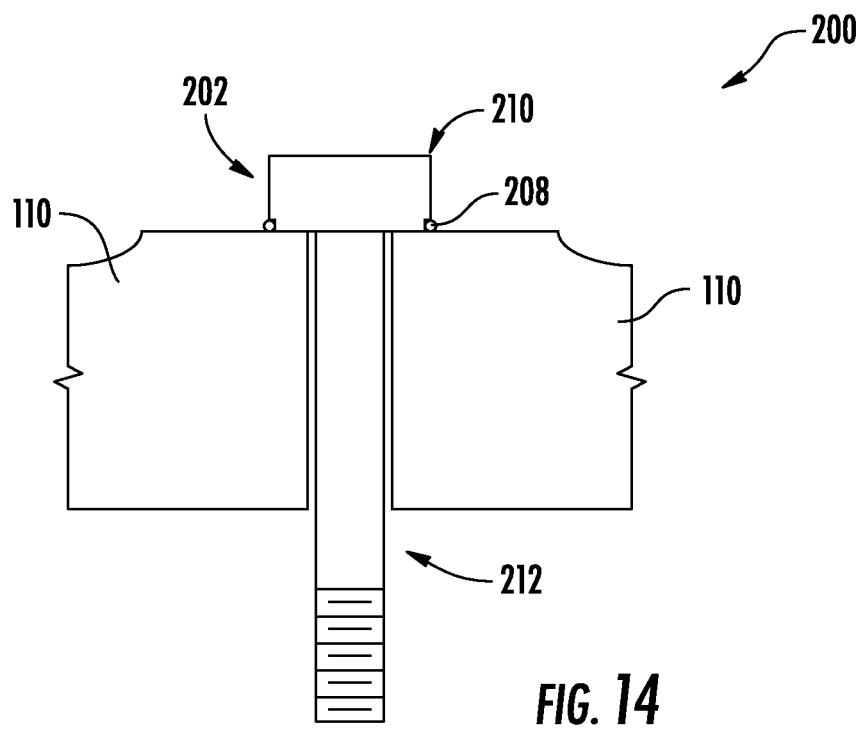
FIG. 14 illustrates a side section view of one embodiment of a mounting system for coupling a hub to a main shaft of the wind turbine according to the present disclosure.

In an additional embodiment, such as depicted in FIG. 14, the connection mechanism 208 may be at least one of an epoxy or a brazing. In such an embodiment, the connection mechanism 208 may be configured to secure and align the fasteners 202 in the corresponding through holes 204. In an embodiment, such a connection mechanism 208 may be configured so as to resist a torque transmitted to the shank section 212 during a coupling operation. In an alternative embodiment, the connection mechanism 208 may secure the fasteners 202 while the circumferential ridge segment(s) 206 may be employed to resist the torque. In order to facilitate future maintenance operations, the connection mechanism 208, in the form of an epoxy or braze, may form a temporary connection between the fasteners 202 and the hub 110. For example, in an embodiment, the fasteners 202 may be released by the application of a solvent and/or heat to the epoxy or braze.

Figure 15:
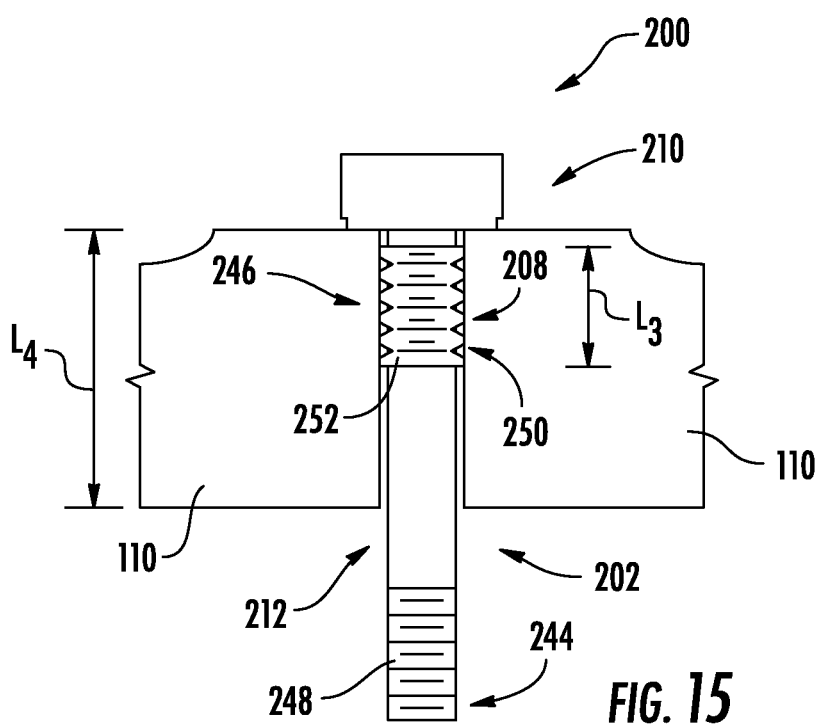
FIG. 15 illustrates a side section view of one embodiment of a mounting system for coupling a hub to a main shaft of the wind turbine according to the present disclosure.

Referring now to FIG. 15, another embodiment of the mounting system 200 is depicted according to the present disclosure. As depicted, the shank section 212 of the fasteners 202 may include a first end 244 and a second end 246 disposed opposite thereof. The first end 244 may define a first threaded portion 248 configured to be received by the main shaft 122 of the wind turbine 100. In such an embodiment, the connection mechanism 208 may include a threaded portion 250 of each of the through holes 204. The threaded portions 250 may have a longitudinal length ($L_3$) which is less than a longitudinal length ($L_4$) of the through hole 204. The connection mechanism 208 may also include a second threaded portion 252 defined by the second end 246 of the fasteners 202. The second threaded portion 252 may be configured to engage the corresponding threaded portion 250 of the through holes 204. The engagement of the threaded portions 250, 252 may limit an axial translation of the fasteners 202 prior to the coupling of the hub 110 to the main shaft 122.

Referring still to FIG. 15, the second threaded portion 252 may also be configured to resist a torque transmitted to the first threaded portion 248. In at least one embodiment, the thread pattern of the second threaded portion 252 may be reversed from the thread pattern of the first thread portion 248. The opposing thread patterns of the first and second threaded portions 248, 252 may facilitate the connection mechanism 208 in resisting a torque applied to the first threaded portion 248, such as during the coupling of a nut to the first threaded portion. As such, the mounting system 200 may not require a circumferential ridge segment 206 in order to resist the torque applied to the first threaded portion 248.

In yet another embodiment, the first and second threaded portions 248, 252 of the fasteners 202 may have the same thread pattern. In such an embodiment, the threaded portion 250 of the through hole 204 and the second threaded portion 252 may be positioned so that a torque applied to the first threaded portion 248 causes the second threaded portion 252 to advance longitudinally within the through holes 204 and disengage from the threaded portion 250 of the through holes 204.

Figure 17:
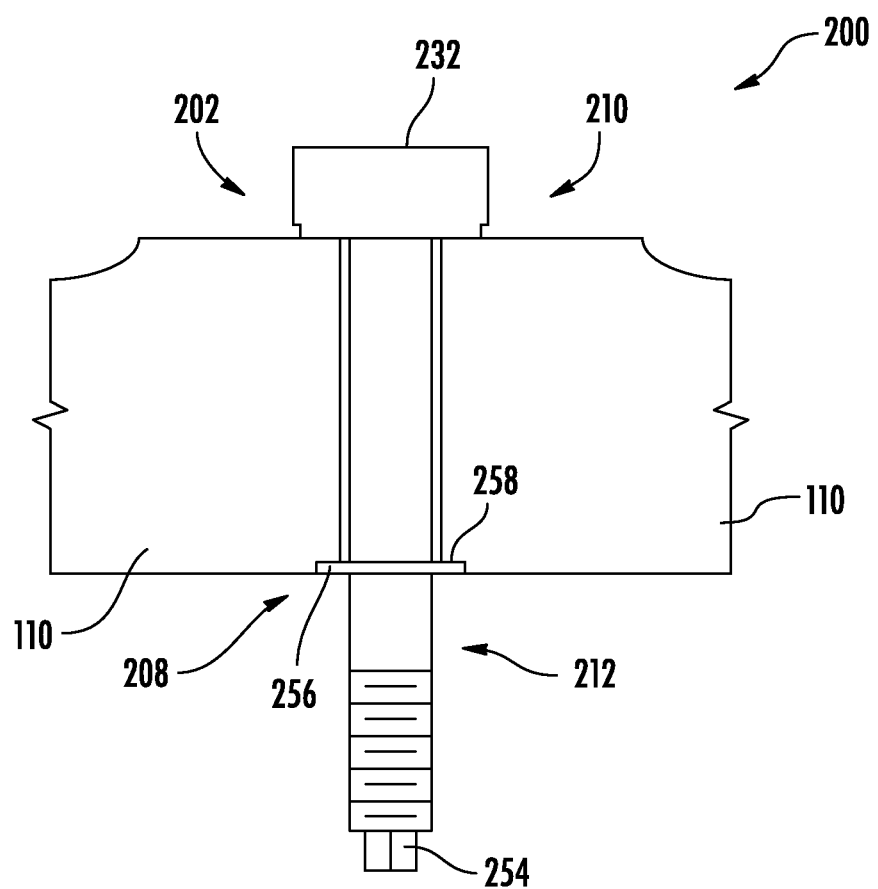
FIG. 17 illustrates a side section view of one embodiment of a mounting system for coupling a hub to a main shaft of the wind turbine according to the present disclosure.

Referring now to FIG. 17, still another embodiment of the mounting system 200 is depicted according to the present disclosure. As depicted, the fasteners 202 may be formed with a fixing element 254. The fixing element 254 may be coupled to the shank section 212 opposite the head section 210. In at least one embodiment, a tool may be coupled to the fixing element 254 and employed to resist a torque applied to the fastener 202 during a coupling operation. For example, in at least one embodiment, the fasteners 202 may be received by the corresponding receiving holes 130 and a securing fastener (not shown) may be threaded onto the shank section 212. The fasteners 202 may be held in position as a torque is applied to the securing fastener by a tool coupled to the fixing element 254. In at least one embodiment, the fixing element 254 may be configured to be received by a tool. For example, the fixing element 254 may have a polygonal cross-section (e.g., a hex head, a square head, a triangular head, etc.) and may be secured by a wrench, a socket, or other similar tool. In an alternative embodiment, the fixing element 254 a be configured to receive the tool in a recess. For example, the fixing element 254 may be configured to receive a square drive, a hex key, or a star bit. It should be appreciated that since the rotation of the fasteners 202 may be prevented by the tool coupled to the fixing element 254, it may be unnecessary for the mounting system 200 to include a circumferential ridge segment 206 in such an embodiment.

Referring still to FIG. 17, in an embodiment, the securing mechanism 208 may include at least one retaining clip 256. The retaining clip(s) 256 may be coupled to the shank section 212. The retaining clip(s) 256 may be positioned adjacent to the hub 110 opposite the head section 210. In an embodiment, at least one depression 258 may be formed in the hub 110 so as to facilitate the recessing of the retaining clip(s) 256. In an alternative embodiment, the retaining clip(s) 256 may be disposed between the hub 110 and the main shaft 122. For example, in at least one embodiment, a single retaining clip 256 retains all of the fasteners 202. In such an embodiment, the single retaining clip 256 may serve as a washer or spacer between the hub 110 and the main shaft 122. In at least one embodiment, the retaining clip(s) 256 may be configured so that the fasteners 202 may be extracted from the hub 110 in order to perform a future maintenance operation.

Referring again to FIG. 4, in an embodiment, the mounting system 200 may include at least one alignment pin 260. The alignment pin(s) 260 may have a length ($L_2$) greater than the length ($L_1$) of the fastener 202. In an embodiment, the alignment pin(s) 260 may replace at least one of the fasteners 202 in a through hole 204. In an additional embodiment, the alignment pin(s) 260 may be a fastener 202 having a greater length ($L_2$) than the other fasteners 202. Due to the greater length ($L_2$) of the alignment pin(s) 260, the alignment pin may be brought into contact with the main shaft 122 and receiving holes 130 prior to the fasteners 202. As such, the alignment pin(s) 260 may be configured to facilitate the alignment of the fasteners 202 with the corresponding receiving holes 130. It should be appreciated that the greater length ($L_2$) of the alignment pin(s) 260 relative to the length ($L_1$) of the fasteners 202 may facilitate the alignment pin(s) 260 protecting the fasteners 202 from an inadvertent contact with the main shaft 122 and the resultant potential damage to the fasteners 202.

Figure 18:
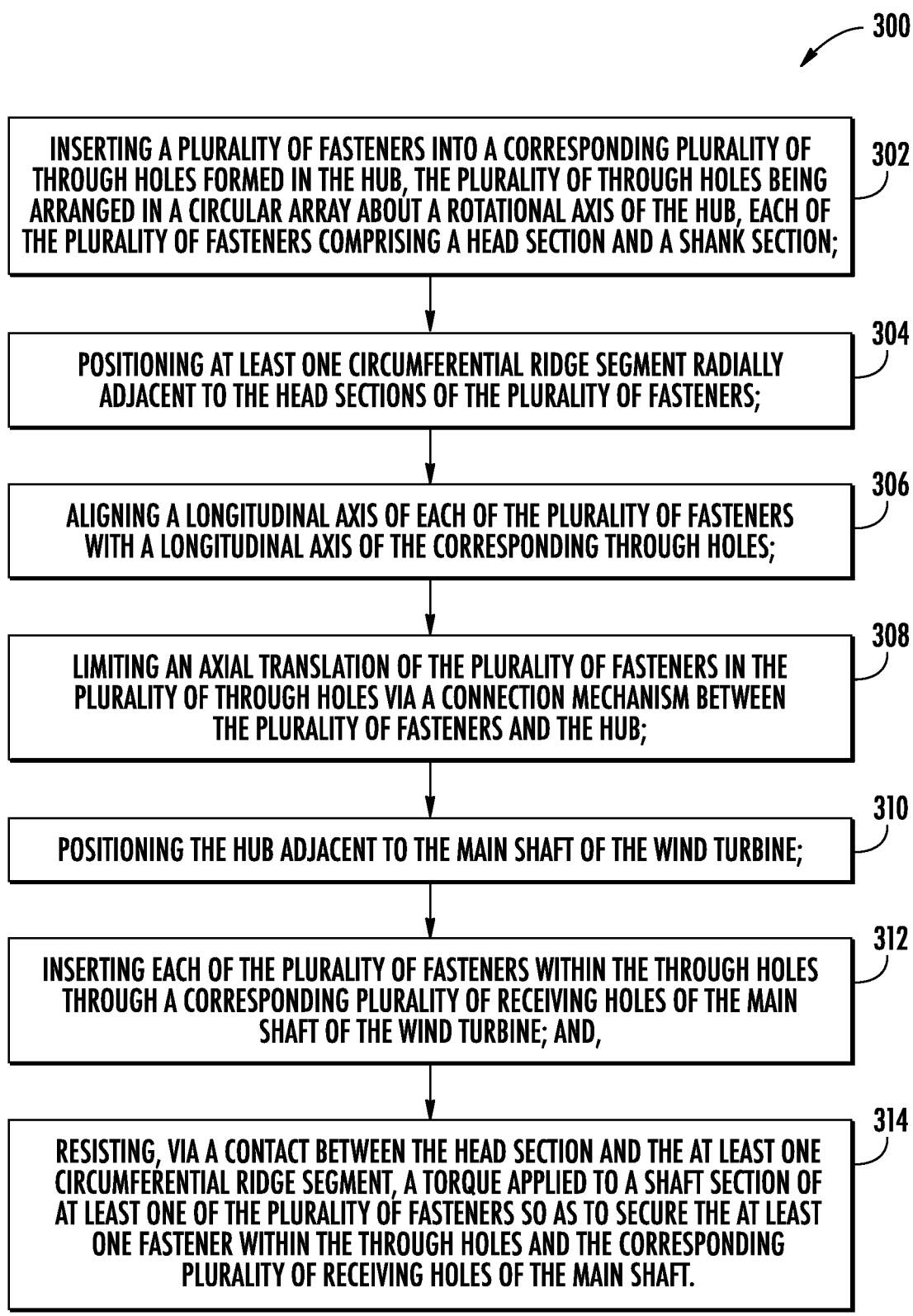
FIG. 18 illustrates a flow diagram of one embodiment of a method for coupling a hub to a main shaft of a wind turbine according to the present disclosure.

Referring now to FIG. 18, a flow diagram of one embodiment of a method 300 for coupling a hub to a main shaft of a wind turbine is illustrated. The method 300 may be implemented using, for instance, the mounting system 200 discussed above with references to FIGS. 4-17. FIG. 18 depicts steps performed in a particular order for purposes of illustration and discussion. Those of ordinary skill in the art, using the disclosures provided herein, will understand that various steps of the method 300, or any of the methods disclosed herein, may be adapted, modified, rearranged, performed simultaneously, or modified in various ways without deviating from the scope of the present disclosure.

As shown at (302), the method 300 may include inserting a plurality of fasteners into a corresponding plurality of through holes formed in the hub. The plurality of through holes may be arranged in a circular array about a rotational axis of the hub. Each of the plurality of fasteners may include a head section and a shank section. As shown at (304), the method 300 may include positioning at least one circumferential ridge segment radially adjacent to the head sections of the plurality of fasteners. As shown at (306), the method 300 may include aligning a longitudinal axis of each of the plurality of fasteners with a longitudinal axis of the corresponding through holes. As shown at (308), the method 300 may include limiting an axial translation of the plurality of fasteners in the plurality of through holes via a connection mechanism between the plurality of fasteners and the hub. As shown at (310), the method 300 may include positioning the hub adjacent to the main shaft of the wind turbine. As shown at (312), the method 300 may include inserting each of the plurality of fasteners within the through holes through a corresponding plurality of receiving holes of the main shaft of the wind turbine. As shown at (314), the method 300 may include resisting, via a contact between the head section and the at least one circumferential ridge segment, a torque applied to the shaft section so as to secure each of the plurality of fasteners within the through holes and the corresponding plurality of receiving holes of the main shaft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for coupling a hub to a main shaft of a wind turbine, the method comprising inserting a plurality of fasteners into a corresponding plurality of through holes formed in the hub, the plurality of through holes being arranged in a circular array about a rotational axis of the hub, each of the plurality of fasteners comprising a head section and a shank section; positioning at least one circumferential ridge segment radially adjacent to the head sections of the plurality of fasteners; aligning a longitudinal axis of each of the plurality of fasteners with a longitudinal axis of the corresponding through holes; limiting an axial translation of the plurality of fasteners in the plurality of through holes via a connection mechanism between the plurality of fasteners and the hub; positioning the hub adjacent to the main shaft of the wind turbine; inserting each of the plurality of fasteners within the through holes through a corresponding plurality of receiving holes of the main shaft of the wind turbine; and resisting, via a contact between the head section and the at least one circumferential ridge segment, a torque applied to the shaft section so as to secure each of the plurality of fasteners within the through holes and the corresponding plurality of receiving holes of the main shaft.

Clause 2. The method of any preceding clause, wherein positioning the at least one ridge segment further comprises machining a U-channel on the hub, the U-channel comprising: at least one radially inner circumferential ridge segment disposed adjacent to a radially inner face of the head sections of the plurality of fasteners; and at least one radially outer circumferential ridge segment disposed adjacent to a radially outer face of the head sections of the plurality of fasteners, wherein the radially inner and radially outer circumferential ridge segments define an axial plane which is coplanar with an axial face of the head sections of the plurality of fasteners.

Clause 3. The method of any preceding clause, wherein limiting the axial translation of the plurality of fasteners via a connection mechanism further comprises coupling at least one retaining ring segment to the hub, the at least one retaining ring segment being positioned adjacent to an axial face of the head sections of the plurality of fasteners opposite the shank section.

Clause 4. The method of any preceding clause, wherein the retaining ring segment and the at least one circumferential ridge segments are a unitary component, and wherein positioning the at least one circumferential ridge segment further comprises coupling the unitary component to the hub radially adjacent to the head sections and adjacent to the axial face of the head sections.

Clause 5. The method of any preceding clause, wherein the retaining ring segment is a spring member or further comprises an elastomeric member disposed in contact with the axial face of the head sections of the plurality of fasteners, and wherein limiting an axial translation further comprises: absorbing a shock during a mounting procedure while retaining the alignment of the longitudinal axis of each of the plurality of fasteners with the longitudinal axis of the corresponding through holes.

Clause 6. A mounting system for coupling a hub to a main shaft of a wind turbine, the mounting system comprising: a plurality of fasteners arranged within corresponding through holes arranged in a circular array about a rotational axis of the hub, each of the plurality of fasteners comprising a head section and a shank section, the head section having a cross-sectional area greater than a cross-sectional area of the shank section, wherein the head section distributes a torque load to the hub when coupled to the main shaft; at least one circumferential ridge segment arranged radially adjacent to the head sections of the plurality of fasteners so as to resist a torque applied to each of the plurality of fasteners; and a connection mechanism securing the plurality of fasteners within the plurality of through holes so as to limit an axial translation of the plurality of fasteners prior to the coupling of the hub to the main shaft.

Clause 7. The mounting system of any preceding clause, wherein the at least one circumferential ridge segment comprises a U-channel, the U-channel comprising: at least one radially inner circumferential ridge segment disposed adjacent to a radially inner face of the head sections of the plurality of fasteners; and at least one radially outer circumferential ridge segment disposed adjacent to a radially outer face of the head sections of the plurality of fasteners, wherein the radially inner and radially outer circumferential ridge segments define an axial plane which is coplanar with an axial face of the head sections of the plurality of fasteners.

Clause 8. The mounting system of any preceding clause, wherein the connection mechanism comprises at least one retaining ring segment spanning the U-channel, the at least one retaining ring segment being coupled to the radially inner and radially outer circumferential ridge segments.

Clause 9. The mounting system of any preceding clause, wherein the at least one circumferential ridge segment is integrally formed with the hub.

Clause 10. The mounting system of any preceding clause, wherein the connection mechanism comprises at least one retaining ring segment coupled to the hub, the at least one retaining ring segment being positioned adjacent to an axial face of the head sections of the plurality of fasteners opposite the shank section.

Clause 11. The mounting system of any preceding clause, wherein the retaining ring segment further comprises an elastomeric member disposed in contact with the axial face of the head sections of the plurality of fasteners, the elastomeric member being configured to absorb a shock during a mounting procedure, the elastomeric member being further configured to retain an alignment of a longitudinal axis of each of the plurality of fasteners with a longitudinal axis of the corresponding through holes.

Clause 12. The mounting system of any preceding clause, wherein the retaining ring segment is a spring member disposed in contact with the axial face of the head sections of the plurality of fasteners, the spring member being configured to absorb a shock during a mounting procedure, the spring member being further configured to retain an alignment of a longitudinal axis of each of the plurality of fasteners with a longitudinal axis of the corresponding through holes.

Clause 13. The mounting system of any preceding clause, wherein the retaining ring segment is coupled to the at least one circumferential ridge segment.

Clause 14. The mounting system of any preceding clause, wherein the retaining ring segment and the at least one circumferential ridge segments are a unitary component, the unitary component being coupled to the hub.

Clause 15. The mounting system of any preceding clause, wherein the head section comprises a square head and an integral washer disposed between the square head and the shank section, wherein the square head has a width which is greater than or equal to 175% and less than or equal to 225% of a shank section diameter; the integral washer has a diameter which is greater than or equal to 150% and less than or equal to 200% of the shank section diameter; and the integral washer has a height which is greater than or equal to 10% and less than or equal to 20% of the shank section diameter.

Clause 16. The mounting system of any preceding clause, wherein the shank section comprises an alignment portion disposed adjacent to the head section, the alignment portion retaining an alignment of a longitudinal axis of each of the plurality of fasteners with a longitudinal axis of the corresponding through holes, the alignment portion having a diameter which is greater than 98% and less than 100% of a diameter of the through hole.

Clause 17. The mounting system of any preceding clause, wherein the connection mechanism further comprises a bushing encircling a portion of the shank section, the bushing being further configured to absorb a shock during a mounting procedure and to retain an alignment of a longitudinal axis of each of the plurality of fasteners with a longitudinal axis of the corresponding through holes.

Clause 18. The mounting system of any preceding clause, further comprising at least one alignment pin secured in at least one of the through holes, the at least one alignment pin having a length greater than a length of the plurality of fasteners.

Clause 19. The mounting system of any preceding clause, wherein the connection mechanism is at least one of an epoxy or a brazing.

Clause 20. A mounting system for coupling a hub to a main shaft of the wind turbine, the mounting system comprising: a plurality of fasteners arranged within corresponding through holes arranged in a circular array about a rotational axis of the hub, each of the plurality of fasteners comprising a head section and a shank section, the head section having a cross-sectional area greater than a cross-sectional area of the shank section, the shank section having a first end and a second end disposed opposite thereof, the first end defining a first threaded portion configured to be received by the main shaft of the turbine; a connection mechanism securing the plurality of fasteners within the plurality of through holes so as to limit an axial translation of the plurality of fasteners prior to the coupling of the hub to the main shaft, the connection mechanism comprising: a threaded portion of each of the through holes, the threaded portions having a longitudinal length less than a longitudinal length of the through hole, and a second threaded portion defined by the second end of the plurality of fasteners, wherein the second threaded portion is configured to engage the corresponding threaded portion of the through holes, the second threaded portion being configured to resist a torque transmitted to the first threaded portion.

What is claimed is:

1. A method for coupling a hub to a main shaft of a wind turbine, the method comprising:
   inserting a plurality of fasteners into a corresponding plurality of through holes formed in the hub, the plurality of through holes being arranged in a circular array about a rotational axis of the hub, each of the plurality of fasteners comprising a head section and a shank section;
   positioning at least one circumferential ridge segment radially adjacent to the head sections of the plurality of fasteners;
   aligning a longitudinal axis of each of the plurality of fasteners with a longitudinal axis of the corresponding through holes;
   limiting an axial translation of the plurality of fasteners in the plurality of through holes via a connection mechanism between the plurality of fasteners and the hub, wherein limiting the axial translation of the plurality of fasteners via the connection mechanism further comprises coupling at least one retaining ring segment to the hub, the at least one retaining ring segment being positioned adjacent to an axial face of the head sections of the plurality of fasteners opposite the shank section;
   positioning the hub adjacent to the main shaft of the wind turbine;
   inserting each of the plurality of fasteners within the through holes through a corresponding plurality of receiving holes of the main shaft of the wind turbine; and
   resisting, via a contact between the head section and the at least one circumferential ridge segment, a torque applied to a shaft section of at least one of the plurality of fasteners so as to secure the at least one fastener within the through holes and the corresponding plurality of receiving holes of the main shaft.

2. The method of claim 1, wherein positioning the at least one circumferential ridge segment further comprises machining a U-channel on the hub, the U-channel comprising:
   at least one radially inner circumferential ridge segment disposed adjacent to a radially inner face of the head sections of the plurality of fasteners; and
   at least one radially outer circumferential ridge segment disposed adjacent to a radially outer face of the head sections of the plurality of fasteners, wherein the radially inner and radially outer circumferential ridge segments define an axial plane which is coplanar with an axial face of the head sections of the plurality of fasteners.

3. The method of claim 1, wherein the retaining ring segment and the at least one circumferential ridge segment are a unitary component, and wherein positioning the at least one circumferential ridge segment further comprises coupling the unitary component to the hub radially adjacent to the head sections and adjacent to the axial face of the head sections.

4. The method of claim 1, wherein the retaining ring segment is a spring member or further comprises an elastomeric member disposed in contact with the axial face of the head sections of the plurality of fasteners, and wherein limiting an axial translation further comprises:
absorbing a shock during a mounting procedure while retaining the alignment of the longitudinal axis of each of the plurality of fasteners with the longitudinal axis of the corresponding through holes.

5. A mounting system for coupling a hub to a main shaft of a wind turbine, the mounting system comprising:
a plurality of fasteners arranged within corresponding through holes arranged in a circular array about a rotational axis of the hub, each of the plurality of fasteners comprising a head section and a shank section, the head section having a cross-sectional area greater than a cross-sectional area of the shank section, wherein the head section distributes a torque load to the hub when coupled to the main shaft;
at least one circumferential ridge segment arranged radially adjacent to the head sections of the plurality of fasteners so as to resist a torque applied to each of the plurality of fasteners; and
a connection mechanism securing the plurality of fasteners within the plurality of through holes so as to limit an axial translation of the plurality of fasteners prior to the coupling of the hub to the main shaft, wherein the connection mechanism comprises at least one retaining ring segment positioned adjacent to an axial face of the head sections of the plurality of fasteners opposite the shank section.

6. The mounting system of claim 5, wherein the at least one circumferential ridge segment comprises a U-channel, the U-channel comprising:
at least one radially inner circumferential ridge segment disposed adjacent to a radially inner face of the head sections of the plurality of fasteners; and
at least one radially outer circumferential ridge segment disposed adjacent to a radially outer face of the head sections of the plurality of fasteners, wherein the radially inner and radially outer circumferential ridge segments define an axial plane which is coplanar with an axial face of the head sections of the plurality of fasteners.

7. The mounting system of claim 6, wherein the at least one retaining ring segment spans the U-channel, the at least one retaining ring segment being coupled to the radially inner and radially outer circumferential ridge segments.

8. The mounting system of claim 5, wherein the at least one circumferential ridge segment is integrally formed with the hub.

9. The mounting system of claim 5, wherein the at least one retaining ring segment further comprises an elastomeric member disposed in contact with the axial face of the head sections of the plurality of fasteners, the elastomeric member being configured to absorb a shock during a mounting procedure, the elastomeric member being further configured to retain an alignment of a longitudinal axis of each of the plurality of fasteners with a longitudinal axis of the corresponding through holes.

10. The mounting system of claim 5, wherein the at least one retaining ring segment is a spring member disposed in contact with the axial face of the head sections of the plurality of fasteners, the spring member being configured to absorb a shock during a mounting procedure, the spring member being further configured to retain an alignment of a longitudinal axis of each of the plurality of fasteners with a longitudinal axis of the corresponding through holes.

11. The mounting system of claim 5, wherein the at least one retaining ring segment is coupled to the at least one circumferential ridge segment.

12. The mounting system of claim 5, wherein the at least one retaining ring segment and the at least one circumferential ridge segment are a unitary component, the unitary component being coupled to the hub.

13. The mounting system of claim 5, wherein the head section comprises a square head and an integral washer disposed between the square head and the shank section, wherein:
the square head has a width which is greater than or equal to 175% and less than or equal to 225% of a shank section diameter;
the integral washer has a diameter which is greater than or equal to 150% and less than or equal to 200% of the shank section diameter; and
the integral washer has a height which is greater than or equal to 10% and less than or equal to 20% of the shank section diameter.

14. The mounting system of claim 5, wherein the shank section comprises an alignment portion disposed adjacent to the head section, the alignment portion retaining an alignment of a longitudinal axis of each of the plurality of fasteners with a longitudinal axis of the corresponding through holes, the alignment portion having a diameter which is greater than 98% and less than 100% of a diameter of the through hole.

15. The mounting system of claim 5, wherein the connection mechanism further comprises a bushing encircling a portion of the shank section, the bushing being further configured to absorb a shock during a mounting procedure and to retain an alignment of a longitudinal axis of each of the plurality of fasteners with a longitudinal axis of the corresponding through holes.

16. The mounting system of claim 5, further comprising at least one alignment pin secured in at least one of the through holes, the at least one alignment pin having a length greater than a length of the plurality of fasteners.

17. The mounting system of claim 5, wherein the connection mechanism is at least one of an epoxy or a brazing.

18. A mounting system for coupling a hub to a main shaft of a wind turbine, the mounting system comprising:
a plurality of fasteners arranged within corresponding through holes arranged in a circular array about a rotational axis of the hub, each of the plurality of fasteners comprising a head section and a shank section, the head section having a cross-sectional area greater than a cross-sectional area of the shank section, the shank section having a first end and a second end disposed opposite thereof, the first end defining a first threaded portion configured to be received by the main shaft of the turbine;
a connection mechanism securing the plurality of fasteners within the plurality of through holes so as to limit an axial translation of the plurality of fasteners prior to the coupling of the hub to the main shaft, the connection mechanism comprising at least one retaining ring segment positioned adjacent to an axial face of the head sections of the plurality of fasteners opposite the shank section, the connection mechanism comprising:

a threaded portion of each of the through holes, the threaded portions having a longitudinal length less than a longitudinal length of the through hole, and a second threaded portion defined by the second end of the plurality of fasteners, wherein the second threaded portion is configured to engage the corresponding threaded portion of the through holes, the second threaded portion being configured to resist a torque transmitted to the first threaded portion.

* * * * *